(12) United States Patent
Kasai et al.

(10) Patent No.: US 7,488,367 B2
(45) Date of Patent: Feb. 10, 2009

(54) HONEYCOMB FILTER AND METHOD OF MANUFACTURING THE SAME

(75) Inventors: Yoshiyuki Kasai, Kasugai (JP); Toshihiro Hirakawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 467 days.

(21) Appl. No.: 11/230,457

(22) Filed: Sep. 21, 2005

(65) Prior Publication Data

US 2006/0107641 A1    May 25, 2006

(30) Foreign Application Priority Data

Sep. 28, 2004    (JP)    ............... 2004-281140

(51) Int. Cl.
*B01D 46/00*    (2006.01)
*F01N 3/022*    (2006.01)

(52) U.S. Cl. ............... 55/523; 55/282.2; 55/282.3; 55/385.3; 55/524; 55/DIG. 5; 55/DIG. 10; 55/DIG. 30; 95/273; 60/311; 264/628; 264/630; 264/631; 264/DIG. 48; 428/116

(58) Field of Classification Search ............... 55/282.2, 55/282.3, 385.3, 523, 524, DIG. 5, DIG. 10, 55/DIG. 30; 95/273; 60/311; 264/628, 630, 264/631, DIG. 48; 428/116, 117, 118; 502/439
See application file for complete search history.

(56) References Cited

U.S. PATENT DOCUMENTS

| 6,573,208 | B1 * | 6/2003 | Soria et al. ............... 501/95.1 |
| 6,939,825 | B1 * | 9/2005 | Ohno et al. ............... 502/439 |
| 7,189,446 | B2 * | 3/2007 | Olszewski et al. ............... 428/116 |
| 2003/0093982 | A1 * | 5/2003 | Suwabe et al. ............... 55/523 |
| 2005/0202231 | A1 * | 9/2005 | Takata et al. ............... 428/310.5 |

FOREIGN PATENT DOCUMENTS

| EP | 0 753 490 A1 * | 1/1997 |
| EP | 0 834 343 A1 | 4/1998 |
| EP | 1 214 973 A1 | 3/2002 |
| EP | 1 293 241 A2 | 3/2003 |
| JP | A 2002-355511 | 12/2002 |

* cited by examiner

*Primary Examiner*—Jason M Greene
(74) *Attorney, Agent, or Firm*—Oliff & Berridge, PLC

(57) ABSTRACT

A honeycomb filter includes partition walls forming a plurality of cells extending in one direction, and plugging sections alternately plugging the cells at the ends of the honeycomb filter, the partition walls being formed of a porous base material having a porosity of 45 to 70%. When the average pore size of the base material measured by mercury porosimetry is (A) μm and the average pore size of the base material measured by a bubble point method is (B) μm, the average pore size differential rate expressed by "$\{(A-B)/B\}*100$" is 35% or less, and the maximum pore size of the base material measured by the bubble point method is 150 μm or less.

3 Claims, 4 Drawing Sheets

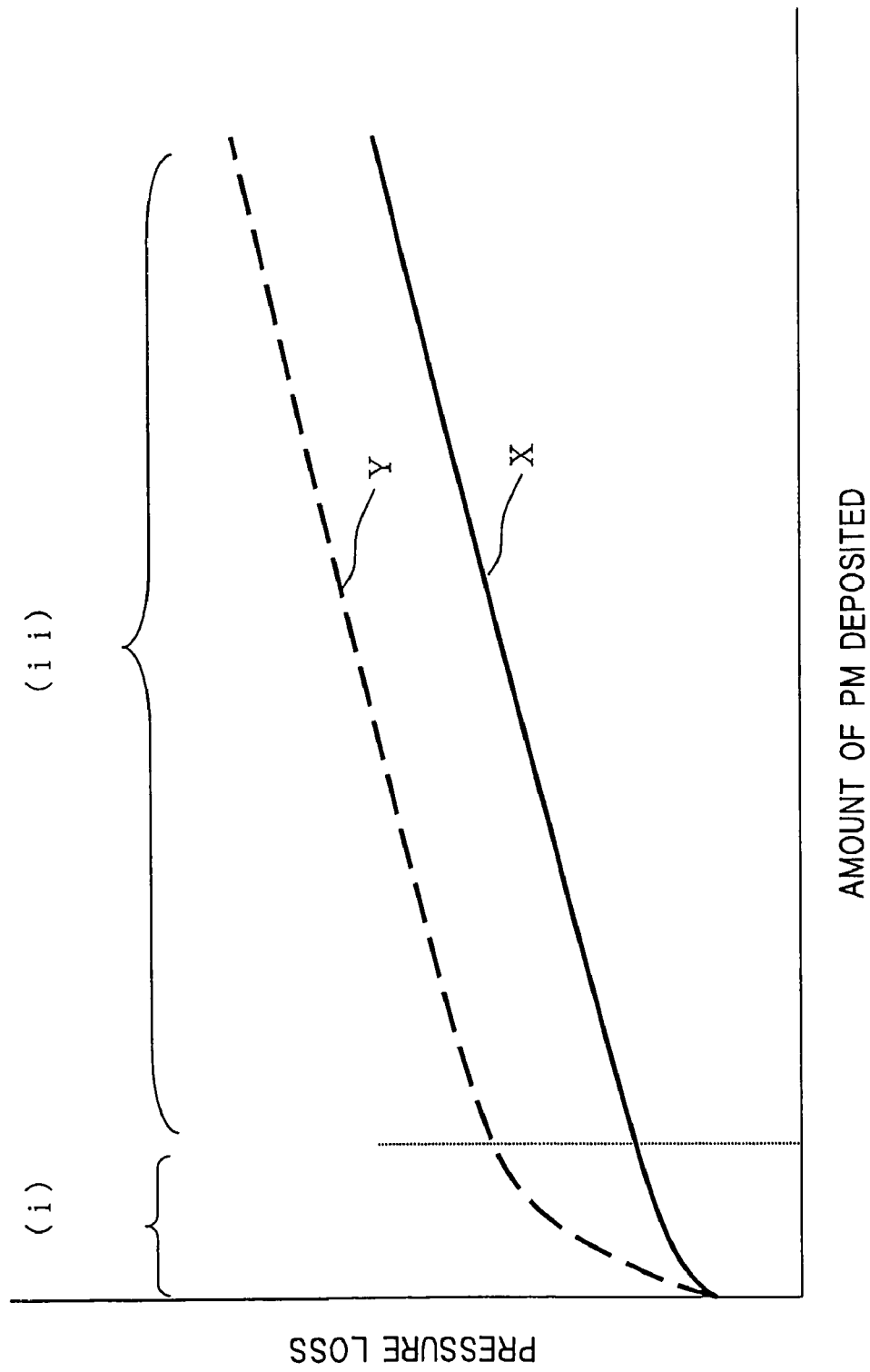

HONEYCOMB FILTER AND METHOD OF MANUFACTURING THE SAME

BACKGROUND OF THE INVENTION

1. Field of the Invention

The present invention relates to a honeycomb filter and a method of manufacturing the same. More particularly, the present invention relates to a honeycomb filter which may be suitably used as a filter for purifying exhaust gas discharged from diesel engines, and a method of manufacturing the same.

2. Description of Related Art

It is necessary to remove particulate matter and toxic substances (hereinafter may be collectively called "PM") from exhaust gas discharged from internal combustion engines, boilers, or the like, taking environmental effects into consideration. In particular, regulations concerning removal of particulate matter discharged from diesel engines have been tightened in Europe, the USA, and Japan. As a diesel particulate filter (hereinafter may be called "DPF") for removing PM, a honeycomb filter has attracted attention.

As shown in FIG. 5, a honeycomb filter generally includes porous partition walls 2 forming a plurality of cells 3 extending in one direction, and plugging sections 4 alternately plugging the cells 3 at ends 42 and 44. In a honeycomb filter 1 configured as shown in FIG. 5, a fluid flows into the cells 3 through inflow openings (e.g. cell openings at the end 42), passes through the partition walls 2, and is discharged from the adjacent cells 3. In this case, the partition walls 2 serve as a filter so that PM is deposited on the partition walls 2.

Since the pressure loss is increased along with deposition of PM on the partition walls, it is necessary to remove such deposited substances. For example, a DPF has been developed in which a catalyst is supported on the partition walls in order to assist burning and removal of PM deposited on the partition walls. A method of continuously burning and removing PM by utilizing an increase in exhaust gas temperature has also been proposed. In another method, mechanical impact is applied to the surfaces of the partition walls of the honeycomb filter to increase the number of pores in the surface area. This increases the contact area between the catalyst supported on the partition walls of the honeycomb structure and PM deposited on the partition walls to increase the oxidation performance (see patent document 1, for example).

[Patent document 1] JP-A-2002-355511

SUMMARY OF THE INVENTION

The method proposed in the patent document 1 is effective when continuously burning and removing PM by utilizing high-temperature exhaust gas. However, since the engine load is not increased during city driving, the exhaust gas temperature may not be increased to the PM combustion temperature. Therefore, it is necessary to regularly burn and remove PM deposited. In this case, it is important to prevent an increase in pressure loss accompanying an increase in the amount of PM deposited in order to reduce fuel consumption and prevent a decrease in output. Moreover, it is important to accurately detect the amount of PM deposited. Specifically, if the amount of PM deposited in the DPF cannot be accurately detected, an increase in fuel consumption occurs due to melting of the DPF or incorrect filter regeneration.

The present invention was achieved in view of the above-described problems. Accordingly, an object of the present invention is to provide a honeycomb filter which may prevent an increase in pressure loss caused by an increase in the amount of PM deposited on the partition walls, and allows relatively easy and accurate detection of the amount of PM deposited on the partition walls, and a method of manufacturing the same.

The inventors of the present invention conducted extensive studies in order to achieve the above object. As a result, the inventors found the following items. Specifically, in a related-art honeycomb filter, as indicated by a line Y shown in FIG. 1, the pressure loss is rapidly increased in the initial stage (stage (i)) in which PM starts to be deposited on the partition walls, but is relatively slowly and linearly increased in the subsequent stage (stage (ii)) accompanying an increase in the amount of substance deposited.

The inventors also found that a rapid increase in pressure loss in the stage (i) can be reduced as indicated by a line X, by reducing the difference between the average pore size of the porous base material forming the partition walls measured by mercury porosimetry and the average pore size of the porous base material measured by a bubble point method.

Specifically, the present invention provides a honeycomb filter comprising partition walls forming a plurality of cells extending in one direction, and plugging sections alternately plugging the cells at ends of the honeycomb filter, the partition walls being formed of a porous base material having a porosity of 45 to 70%, wherein, when an average pore size of the base material measured by mercury porosimetry is (A) µm and an average pore size of the base material measured by a bubble point method is (B) µm, an average pore size differential rate expressed by "$\{(A-B)/B\}*100$" is 35% or less, and a maximum pore size of the base material measured by the bubble point method is 150 µm or less.

In the present invention, it is preferable that the base material include at least one material selected from the group consisting of cordierite, silicon carbide, silicon nitride, mullite, alumina, and silica.

The present invention also provides a method of manufacturing a honeycomb comprising mixing a raw material with water and forming the mixture to obtain a honeycomb-shaped formed body which includes partition walls forming a plurality of cells extending in one direction, drying the formed body to obtain a first dried body, causing the first dried body to come in contact with water or vapor to plasticize at least a part of a surface of the partition wall, and drying the first dried body to obtain a second dried body, firing the second dried body to obtain a honeycomb-shaped fired body, and alternately plugging the cells of the first dried body, the second dried body, or the fired body to obtain the honeycomb filter.

In the honeycomb filter according to the present invention, since the base material for the partition wall has a porosity within a predetermined range and the average pore size differential rate (hereinafter may be called "pore size differential rate") expressed by the above expression is within a predetermined range, an increase in pressure loss in the stage (i) is reduced as indicated by the line X shown in FIG. 1, whereby an increase in pressure loss due to an increase in the amount of substance deposited on the partition walls can be reduced. Moreover, since an increase in pressure loss accompanying an increase in the amount of substance deposited on the partition walls becomes linear, the amount of substance deposited on the partition walls can be more accurately detected by measuring the pressure loss.

BRIEF DESCRIPTION OF THE DRAWINGS

FIG. 1 is a diagram schematically showing the relationship between the amount of PM deposited and the pressure loss in a related-art honeycomb filter and a honeycomb filter according to the present invention.

DETAILED DESCRIPTION OF THE PREFFERRED EMBODIMENT

Embodiments of the present invention are described below in detail. However, the present invention is not limited to the following embodiments. It should be understood that various modifications and improvements may be made within the scope of the present invention based on knowledge of a person skilled in the art.

Figure 2A:
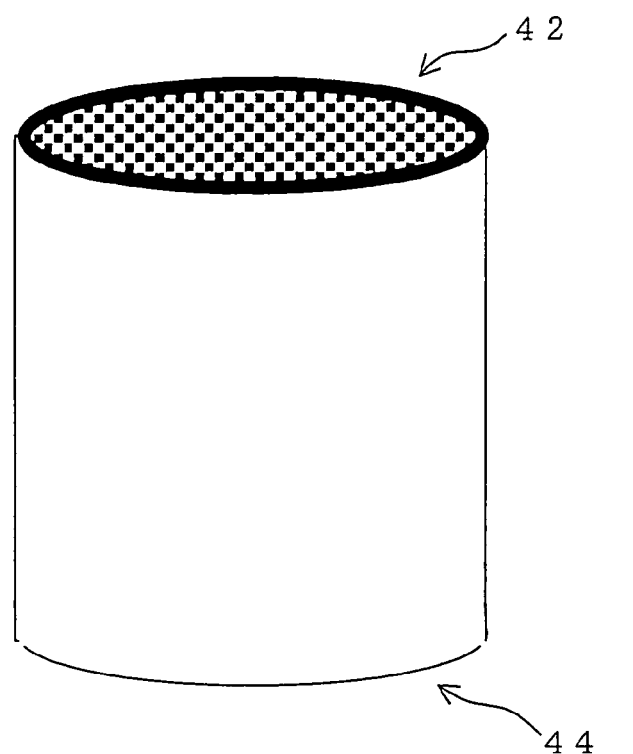
FIGS. 2A and 2B are schematic diagrams showing one embodiment of the honeycomb filter according to the present invention, with FIG. 2A being a schematic oblique diagram and FIG. 2B being a schematic side cross-sectional diagram.
Figure 2B:
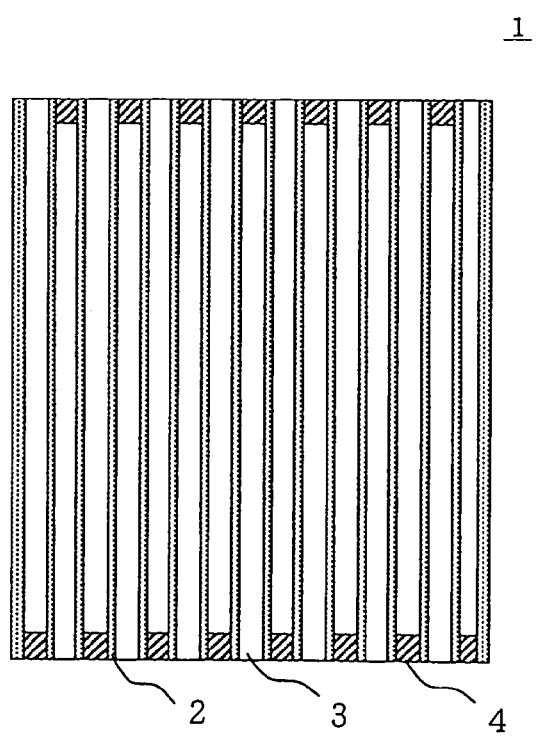

FIGS. 2A and 2B are schematic diagrams showing one embodiment of a honeycomb filter according to the present invention. FIG. 2A is a schematic oblique diagram, and FIG. 2B is a schematic cross-sectional diagram. A honeycomb filter 1 shown in FIGS. 2A and 2B includes partition walls 2 forming a plurality of cells 3 extending in one direction, and plugging sections 4 alternately plugging the cells 3 at ends 42 and 44. The partition wall 3 is formed of a porous base material having a porosity of 45 to 70%, and the porous base material has a pore size differential rate, that is, the ratio "$\{(A-B)/B\}*100$" of the difference between the average pore size (A) (μm) measured by mercury porosimetry and the average pore size (B) (μm) measured by a bubble point method to the average pore size (B) (μm) measured by the bubble point method, of 35% or less.

In mercury porosimetry, a sample is immersed in mercury under vacuum, and a uniform pressure is applied. The pressure is gradually increased to cause mercury to be injected into a sample. The pore size distribution is calculated from the pressure and the volume of mercury injected into the pores. When the pressure is gradually increased, mercury is injected into pores having a larger size so that the cumulative volume of mercury is increased. When all the pores are filled with mercury, the cumulative volume of mercury reaches equilibrium. The cumulative volume of mercury at equilibrium is defined as the total pore volume, and the pore size at which mercury in an amount 50% of the total pore volume is injected is defined as the average pore size (median diameter).

In the bubble point method, a sample is immersed in and sufficiently wetted with a liquid having a known surface tension, and a gas pressure is applied to one side of the sample. The gas pressure is gradually increased to calculate the pore size of the sample from the gas pressure and the flow rate of gas. As the gas pressure is increased, liquid inside the pores is removed so that gas flows through the sample. The flow rate of gas increases as the pressure becomes higher. The pore size distribution can be measured by measuring the pressure and the flow rate of gas. The minimum pressure at which gas flows through the sample is called a bubble point, and the pore size corresponding to the minimum pressure is defined as the maximum pore size of the sample. In the bubble point method, since the pressure is applied to only one side of the sample, the minimum size of a certain pore formed through the partition wall is measured.

Figure 3:
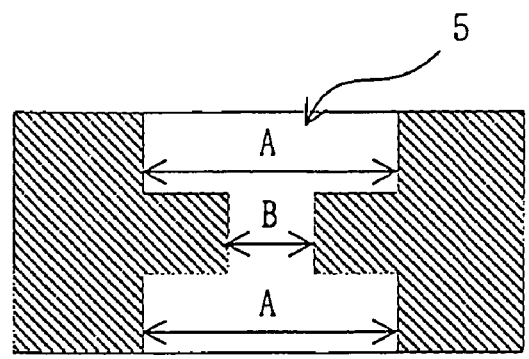
FIG. 3 is a schematic diagram showing one form of a pore formed through a partition wall.

FIG. 3 is a diagram schematically showing a pore 5 formed through a sample. When measuring the pore 5 shown in FIG. 3 by mercury porosimetry, mercury is injected into a section A (section having large pore size) at a specific pressure. When the pressure is increased, mercury is injected into a section B (section having small pore size). Therefore, when measuring the pore 5 having such a configuration, the pore size distribution is also measured for one pore 5. When measuring the pore 5 shown in FIG. 3 by using the bubble point method, gas flows through the sample when gas pressure which causes liquid to flow from the section B having the smallest diameter is applied. Therefore, the bubble point method measures only the minimum diameter of one pore.

Figure 4A:
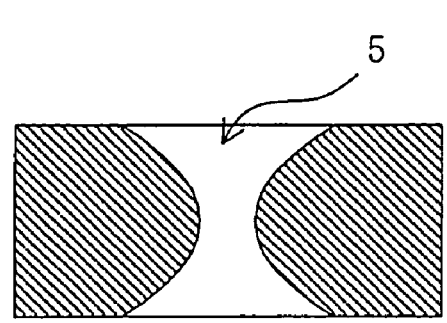
FIG. 4A is a diagram schematically showing another form of a pore formed through a partition wall.
Figure 4B:
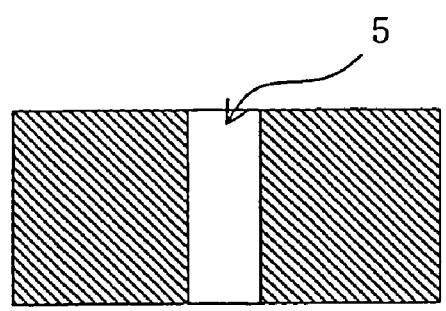
FIG. 4B is a diagram schematically showing still another form of a pore formed through a partition wall.
Figure 4C:
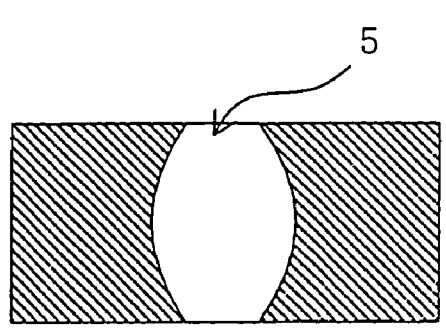
FIG. 4C is a diagram schematically showing yet another form of a pore formed through a partition wall.
Figure 5:
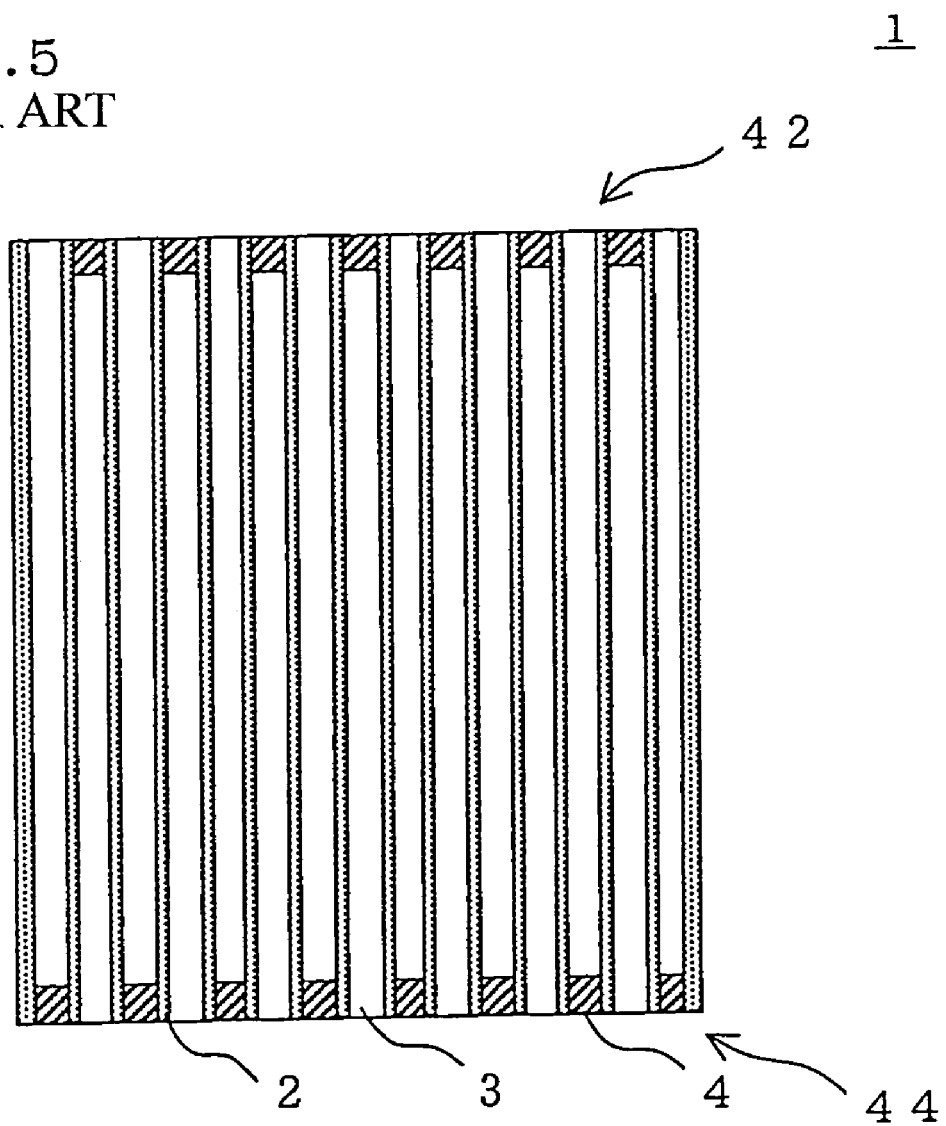
FIG. 5 is a schematic side cross-sectional diagram showing an example of a related-art honeycomb structure.

FIGS. 4A to 4C are schematic cross-sectional diagrams of partition walls showing forms of the pore 5 formed through the partition wall. When measuring a partition wall having a large number of pores 5 as shown in FIG. 4A by mercury porosimetry and the bubble point method, the average pore size measured by the bubble point method is significantly smaller than the average pore size measured by mercury porosimetry. On the other hand, when measuring a partition wall having a large number of pores 5 as shown in FIGS. 4B and 4C by mercury porosimetry and the bubble point method, the average pore size measured by mercury porosimetry and the average pore size measured by the bubble point method do not differ to a large extent.

Therefore, when the difference between the average pore size measured by mercury porosimetry and the average pore size measured by the bubble point method is smaller than that of an ordinary partition wall, the number of pores 5 having a small size inside the partition wall and a large size in the surface area of the partition wall, as shown in FIG. 4A, is smaller than that of an ordinary partition wall, or the size of the pores in the surface area of the partition wall is smaller than the size of the pores inside the partition wall in comparison with an ordinary partition wall. Or, the number of pores 5 of which the size inside the partition wall is equal to or greater than the size in the surface area of the partition wall, as shown in FIG. 4B or 4C, is greater than that of an ordinary partition wall.

When using a partition wall having a large number of pores 5 having a small size inside the partition wall and a large size in the surface area of the partition wall, as shown in FIG. 4A, since PM enters the partition wall in the PM trapping initial stage (stage (i) shown in FIG. 1), a rapid increase in pressure loss occurs. In the subsequent stage (stage (ii) shown in FIG. 1), the pressure loss is relatively slowly increased in proportion to the amount of PM deposited on the partition wall. When the number of pores 5 as shown in FIG. 4A is small and the number of pores 5 as shown in FIGS. 4B and 4C is large, since only a small amount of PM enters the partition wall in the stage (i), a rapid increase in pressure loss is prevented, and the pressure loss is relatively slowly increased after the stage (i) in proportion to the amount of PM deposited on the partition wall.

Therefore, an increase in pressure loss in the stage (i) is reduced by forming the base material for the partition wall so that the base material has a small difference between the average pore size measured by mercury porosimetry and the average pore size measured by the bubble point method, whereby an increase in pressure loss due to an increase in the amount of substance deposited on the partition walls can be reduced. Moreover, since the relationship between an increase in the amount of substance deposited on the partition walls and an increase in pressure loss becomes closer to a linear function, the amount of substance deposited on the partition walls can be more accurately detected by measuring the pressure loss.

In order to obtain the above-described effects, it is necessary that the pore size differential rate be 35% or less. It is preferable that the pore size differential rate be 20% or less.

If the porosity of the base material is too small, the pressure loss is increased to a large extent when PM is deposited on the partition walls. Therefore, it is necessary that the porosity be 45% or more. It is preferable that the porosity be 50% or more, and still more preferably 60% or more. If the porosity of the base material is too large, the strength of the honeycomb filter is significantly decreased. Therefore, it is necessary that the porosity be 70% or less. It is preferable that the porosity be 65% or less.

It is necessary to adjust the average pore size of the base material measured by the bubble point method within a predetermined range in order to prevent a decrease in engine output by reducing the pressure loss when PM is not deposited to reduce power consumption. Specifically, it is necessary that the average pore size measured by the bubble point method be 15 to 30 μm. It is preferable that the average pore size measured by the bubble point method be 20 to 25 μm.

If the maximum pore size of the base material measured by the bubble point method is too large, the trapping efficiency may be decreased. Therefore, it is necessary that the maximum pore size be 150 μm or less. It is preferable that the maximum pore size be 140 μm or less, and particularly preferably 130 μm or less.

The material for the base material for the partition wall is not particularly limited. It is preferable that the material be a ceramic material from the viewpoint of strength and heat resistance. In more detail, it is preferable that the material include at least one material selected from the group consisting of cordierite, silicon carbide, silicon nitride, mullite, alumina, and silica, for example. It is preferable that the material include the above-mentioned material in an amount of 50 mass % or more, and preferably 80 mass % or more.

The material for the plugging section is not particularly limited. It is preferable that the material for the plugging section be a ceramic material, which may be selected from the materials given as preferable materials for the base material for the partition wall. It is preferable that the plugging section include the same type of material as the material for the base material.

The thickness of the partition wall is not particularly limited. If the thickness of the partition wall is too great, the pressure loss may be increased to a large extent. If the thickness of the partition wall is too small, the strength may be decreased. The thickness of the partition wall is preferably 30 to 2,000 μm, still more preferably 40 to 1,000 μm, and particularly preferably 50 to 500 μm.

The cross-sectional shape of the cell is not particularly limited. The cross-sectional shape of the cell may be triangular, quadrangular, hexagonal, circular, or the like. The cell density (number of cells in unit cross-sectional area) is not particularly limited. The cell density is preferably 6 to 2000 cells/in$^2$ (0.9 to 311 cells/cm$^2$), still more preferably 50 to 1,000 cells/in$^2$ (7.8 to 155 cells/cm$^2$), and particularly preferably 100 to 400 cells/in$^2$ (15.5 to 62.0 cells/cm$^2$).

The cross-sectional shape of the honeycomb filter is not particularly limited. The cross-sectional shape of the honeycomb filter may be circular, oval, race track shape, elliptical, polygonal such as triangular, approximately triangular, quadrangular, or approximately quadrangular, or a miscellaneous shape.

It is preferable that a catalyst which assists PM combustion be supported on the surface of the base material for the partition wall or inside the base material. For example, a noble metal such as Pt, Pd, or Rh, an alkali metal, an alkaline earth metal, a rare earth metal, or the like may be suitably used as the catalyst.

A suitable method of manufacturing the honeycomb filter according to the present invention is described below based on a specific example. The honeycomb filter according to the present invention has a particular feature in the pore configuration of the base material for the partition wall, and the manufacturing method described below can suitably form such a pore configuration. However, such a pore configuration may be formed by using another method. Therefore, the honeycomb filter according to the present invention may be manufactured by using a method other than the method described below.

As a raw material, at least one material selected from the group consisting of cordierite, cordierite-forming raw material (raw material which forms cordierite upon firing), silicon carbide, silicon nitride, mullite, alumina, and silica is provided. After the addition of a binder such as methyl cellulose or hydroxypropyl methyl cellulose, a pore-forming material, a surfactant, water, and the like, the components are mixed according to a known method and extruded to form a honeycomb-shaped formed body. The honeycomb-shaped formed body is dried by using a microwave, hot air, or the like to obtain a honeycomb-shaped dried body (first dried body).

The first dried body is caused to come in contact with water or vapor to plasticize at least a part of the surface of the partition wall. When the surface is plasticized, the plasticized area is densified. The first dried body is then dried again to obtain a second dried body in which a dense layer is formed on the surface. The cells are alternately plugged at each end face of the second dried body so that each end face has a checkered pattern. The second dried body is then fired to obtain a honeycomb filter in which the pore size in the surface area is smaller than that of an ordinary honeycomb filter. As the binder, a binder which is reversibly plasticized in the presence of water, such as methyl cellulose, is preferably used.

The pore size in the surface area may be reduced by causing the formed body to come in contact with water or vapor before drying. However, since the formed body before drying is easily deformed, it is preferable to cause the formed body to contact water or vapor after drying. The concentration of vapor which the formed body or the dried body is caused to contact or the contact time of vapor or water with the formed body or the dried body may be appropriately set depending on the amount of binder added, the particle size of the raw material, and the like. The cells may be plugged in any stage after forming. For example, the cells of the first dried body or the fired body may be plugged.

EXAMPLES

The present invention is described below in more detail based on examples. However, the present invention is not limited to the following examples.

A cordierite-forming raw material, that is, talc, kaolin, alumina, and silica adjusted to form cordierite after firing was provided. After the addition of graphite as a pore-forming material, methyl cellulose was added as a binder. After the addition of water, the components were mixed to prepare clay. The clay was extruded and fired to obtain a formed body in the shape of a cylinder (diameter: 144 mm, length: 152 mm) having a partition wall thickness of 0.3 mm and a cell pitch of 1.47 mm. The resulting formed body was dried to obtain a first dried body. The raw material particle size and the amount of pore-forming material added were changed in order to change the porosity and the average pore size of the resulting honeycomb filter to obtain various first dried bodys.

Saturated vapor was caused to pass through the resulting first dried body for five minutes to one hour to plasticize the surface of the partition wall of the dried body. The first dried body was dried again to obtain a second dried body. Then, the cells were alternately plugged at each end face of the second dried body so that each end face had a checkered pattern. The second dried body was then fired to obtain an objective sample (DPF). As a comparative example, an objective sample (DPF) was obtained without drying the first dried body after causing the first dried body to come in contact with saturated vapor.

The resulting DPF was coated with an oxidizing catalyst, provided with a ceramic mat around the outer circumference of the DPF, and inserted into a container. The DPF was installed in an exhaust gas system connected with a diesel engine with a displacement of 2 L(liters), and the pressure loss and trapping efficiency were measured at an exhaust gas temperature of 200° C., an exhaust gas flow rate of 3.5 Nm$^3$/min, and an amount of PM deposited of 3 g/L. The pressure loss was also measured by using a flow bench at room temperature and an exhaust gas flow rate of 20 Nm$^3$/min in a state in which PM was not deposited.

A pore distribution measurement by mercury porosimetry and a pore distribution measurement by the bubble point method were also conducted using samples obtained from a single lot before coating with the catalyst. The pore distribution measurement by mercury porosimetry was conducted for a sample (0.3 g) cut into an approximately cubic shape. As the measuring instrument, Micromeritics II 9220 (manufactured by Micromeritics Instrument Corporation) was used. The pore distribution measurement by the bubble point method was conducted by using a capillary flow porometer "CFD 1100 AEX" (manufactured by PMI). In the measurement, a partition wall cut in the shape of a disk with a diameter of 20 mm and a thickness of 1 rib (same thickness as the thickness of the partition wall) was used as a sample. The sample was sufficiently immersed in propylene, 1,1,2,3,3,3-hexafluoro-oxidized (CAS No. 69991-67-9) and installed in the instrument. Since the sample is cut in the middle of the cell pitch, it is necessary to sufficiently remove burrs. However, since excessive grinding removes the surface of the partition wall to cause a variation in measurement values, it is necessary to carefully remove burrs. In the measurement by the bubble point method, pressure at which gas initially flows when pressure is applied from one side of the sample is called a bubble point, and the pore size corresponding to this pressure (bubble point) is the maximum pore size.

The results are shown in Table 1. When the porosity was 45% or less, the pressure loss when PM was deposited (PM pressure loss shown in Table 1) was increased. When the porosity was 70% or more, the material strength was decreased to a level unacceptable for practical application. When the pore size differential rate by the bubble point method and mercury porosimetry was 35% or more, the pressure loss when PM was deposited was increased. When the average pore size (average size in Table 1) measured by the bubble point method was 15 μm or less, the initial pressure loss (initial pressure loss in Table 1) was increased. When the average pore size measured by the bubble point method exceeded 30 μm, the trapping efficiency was decreased to a level unacceptable for use under strict regulations. When the maximum pore size (maximum size in Table 1) measured by the bubble point method was 150 μm or more, the trapping efficiency was decreased. In Table 1, the value of the pressure loss when PM was deposited is smaller than the value of the initial pressure loss due to the difference in the flow rate and the temperature during the measurement.

When the average pore size measured by the bubble point method was small, the gas flow resistance inside the partition wall was increased so that an increase in initial pressure loss occurred. The initial pressure loss refers to the pressure loss when PM is not deposited. Since the initial pressure loss affects the maximum output of vehicles, it is preferable that the initial pressure loss be small. The average pore size significantly affects the pressure loss in a state in which PM is not deposited. On the other hand, the porosity of the base material affects the pressure loss to a large extent in a state in which PM is deposited. This is because deposition of PM causes an increase in pressure loss through the deposited PM layer. Therefore, the pressure loss tends to be increased when the porosity is low. When the pore size differential rate by the bubble point method and mercury porosimetry is large, the substantial porosity of the partition wall is decreased due to entrance of PM into the partition wall so that the gas flow resistance is increased to a level equal to or greater than the gas flow resistance of the base material. As a result, the pressure loss is increased. In this case, since the pressure loss is rapidly increased in the PM deposition initial stage, the relationship between the amount of PM deposited on the partition walls and the pressure loss is not linear, so that it becomes difficult to detect the amount of PM deposited on the partition walls from the pressure loss.

TABLE 1

| | | Mercury porosimetry | | Bubble point method | | Average pore size differential rate (%) | Properties | | | |
|---|---|---|---|---|---|---|---|---|---|---|
| | | Porosity (%) | Average size (μm) | Average size (μm) | Maximum pore size (μm) | | PM pressure loss (kPa) | Trapping efficiency (%) | Initial pressure loss (kPa) | Material strength (MPa) |
| Experiment 1 | Comparative Example | 43.2 | 21.4 | 17.8 | 131.1 | 20.3 | 9.12 | 93.5 | 10.2 | 5.7 |
| Experiment 2 | Example | 45.8 | 21.9 | 18.1 | 130.4 | 21.0 | 7.91 | 93.5 | 9.8 | 5.0 |
| Experiment 3 | Comparative Example | 46.1 | 21.7 | 18.1 | 155.0 | 20.0 | 7.91 | 71.0 | 9.7 | 4.8 |
| Experiment 4 | Example | 45.9 | 21.7 | 18.1 | 145.0 | 19.9 | 7.91 | 85.8 | 9.7 | 4.9 |
| Experiment 5 | Comparative Example | 46.1 | 25.1 | 18.2 | 131.0 | 38.1 | 8.65 | 93.3 | 9.8 | 4.8 |
| Experiment 6 | Example | 46.2 | 24.0 | 18.0 | 129.0 | 33.1 | 7.91 | 92.1 | 9.7 | 4.7 |
| Experiment 7 | Comparative Example | 45.9 | 15.9 | 13.2 | 132.4 | 20.4 | 7.88 | 96.3 | 10.4 | 5.1 |
| Experiment 8 | Example | 46.1 | 19.2 | 16.0 | 130.6 | 20.2 | 7.88 | 94.4 | 9.9 | 5.0 |
| Experiment 9 | Comparative Example | 72.3 | 23.5 | 19.9 | 130.0 | 18.1 | 7.16 | 92.2 | 9.2 | 2.4 |

TABLE 1-continued

|  |  | Mercury porosimetry | | Bubble point method | | Average pore size differential rate (%) | Properties | | | |
|---|---|---|---|---|---|---|---|---|---|---|
|  |  | Porosity (%) | Average size (μm) | Average size (μm) | Maximum pore size (μm) |  | PM pressure loss (kPa) | Trapping efficiency (%) | Initial pressure loss (kPa) | Material strength (MPa) |
| Experiment 10 | Example | 68.1 | 24.0 | 20.2 | 129.8 | 18.9 | 6.98 | 92.3 | 9.3 | 2.7 |
| Experiment 11 | Comparative Example | 66.9 | 24.1 | 19.9 | 155.0 | 21.1 | 7.26 | 72.0 | 9.1 | 2.7 |
| Experiment 12 | Example | 67.1 | 24.0 | 20.0 | 145.0 | 20.1 | 7.16 | 84.0 | 9.2 | 2.8 |
| Experiment 13 | Comparative Example | 67.1 | 27.8 | 20.3 | 130.1 | 37.1 | 8.56 | 92.1 | 9.2 | 2.7 |
| Experiment 14 | Example | 66.8 | 26.6 | 20.1 | 131.0 | 32.2 | 7.91 | 92.6 | 9.3 | 2.8 |
| Experiment 15 | Comparative Example | 67.1 | 15.7 | 13.1 | 130.5 | 20.1 | 7.02 | 96.5 | 10.4 | 2.9 |
| Experiment 16 | Example | 67.3 | 19.2 | 16.1 | 130.0 | 19.2 | 6.98 | 94.5 | 9.9 | 2.8 |
| Experiment 17 | Comparative Example | 67.1 | 37.8 | 31.8 | 130.0 | 19.0 | 7.21 | 79.1 | 8.7 | 2.7 |
| Experiment 18 | Example | 66.9 | 33.5 | 27.9 | 130.3 | 20.2 | 7.18 | 84.2 | 9.1 | 2.8 |
| Experiment 19 | Comparative Example | 67.2 | 44.0 | 32.1 | 130.0 | 37.1 | 8.65 | 79.3 | 8.7 | 2.6 |
| Experiment 20 | Example | 67.2 | 37.7 | 28.1 | 131.1 | 34.0 | 7.95 | 84.3 | 9.0 | 2.6 |
| Experiment 21 | Comparative Example | 61.1 | 24.5 | 20.3 | 155.0 | 20.8 | 7.35 | 72.5 | 9.7 | 3.3 |
| Experiment 22 | Example | 61.0 | 24.1 | 20.1 | 145.0 | 20.0 | 7.26 | 84.0 | 9.7 | 3.4 |
| Experiment 23 | Comparative Example | 61.0 | 27.5 | 20.1 | 131.0 | 37.0 | 8.56 | 92.2 | 9.6 | 3.3 |
| Experiment 24 | Example | 61.2 | 26.6 | 19.8 | 131.1 | 34.1 | 7.95 | 93.1 | 9.7 | 3.4 |
| Experiment 25 | Comparative Example | 61.2 | 15.5 | 12.9 | 131.1 | 20.3 | 7.67 | 96.5 | 10.3 | 3.6 |
| Experiment 26 | Example | 61.3 | 19.5 | 16.3 | 130.5 | 19.4 | 7.59 | 94.2 | 9.9 | 3.5 |
| Experiment 27 | Comparative Example | 61.0 | 38.0 | 31.9 | 130.0 | 19.1 | 7.51 | 79.3 | 8.8 | 3.2 |
| Experiment 28 | Example | 60.9 | 33.6 | 28.0 | 129.5 | 20.1 | 7.55 | 83.0 | 9.2 | 3.3 |
| Experiment 29 | Comparative Example | 61.2 | 43.9 | 32.0 | 130.0 | 37.2 | 8.56 | 79.1 | 8.7 | 3.1 |
| Experiment 30 | Example | 61.1 | 37.1 | 28.1 | 130.1 | 32.2 | 7.91 | 82.8 | 9.1 | 3.2 |

Since the honeycomb filter according to the present invention prevents a rapid increase in initial pressure loss due to deposition of PM, the pressure loss when PM is deposited is reduced, and the amount of PM deposited on the partition walls is easily detected. Therefore, the honeycomb filter according to the present invention may be suitably used as various filters such as a DPF. According to the method of manufacturing a honeycomb filter according to the present invention, such a honeycomb filter can be suitably manufactured.

What is claimed is:

1. A honeycomb filter, comprising partition walls forming a plurality of cells extending in one direction, and plugging sections alternately plugging the cells at ends of the honeycomb filter, the partition walls being formed of a porous base material having a porosity of 45 to 70% measured by mercury porosimetry, wherein, when an average pore size of the base material measured by mercury porosimetry is (A) μm and an average pore size of the base material measured by a bubble point method is (B) μm, an average pore size differential rate expressed by "{(A−B)/B}*100" is 35% or less, an average pore size of the base material measured by the bubble point method is 15 to 30 μm, and a maximum pore size of the base material measured by the bubble point method is 150 μm or less.

2. The honeycomb filter as defined in claim 1, wherein the base material includes at least one material selected from the group consisting of cordierite, silicon carbide, silicon nitride, mullite, alumina, and silica.

3. A method of manufacturing a honeycomb filter, the method comprising: mixing a raw material with water and forming the mixture to obtain a honeycomb-shaped formed body which includes partition walls forming a plurality of cells extending in one direction; drying the formed body to obtain a first dried body; causing the first dried body to come in contact with water or vapor to plasticize a portion of a surface of the partition wall, and drying the first dried body to obtain a second dried body; firing the second dried body to obtain a honeycomb-shaped fired body; and alternately plugging the cells of the first dried body, the second dried body, or the fired body to obtain the honeycomb filter.

* * * * *